(12) United States Patent
Jin et al.

(10) Patent No.: US 10,128,703 B2
(45) Date of Patent: Nov. 13, 2018

(54) SHAFT-EMBRACING PERMANENT MAGNET INTER-SHAFT GLUED ROTOR STRUCTURE OF HIGH-SPEED MOTOR

(71) Applicant: SHANGHAI MOONS' ELECTRIC CO., LTD., Shanghai (CN)

(72) Inventors: Wanbing Jin, Shanghai (CN); Huifan Nie, Shanghai (CN)

(73) Assignee: SHANGHAI MOONS' ELECTRIC CO., LTD., Shanghai (CN)

(*) Notice: Subject to any disclaimer, the term of this patent is extended or adjusted under 35 U.S.C. 154(b) by 0 days.

(21) Appl. No.: 15/482,264

(22) Filed: Apr. 7, 2017

(65) Prior Publication Data
US 2017/0214283 A1    Jul. 27, 2017

Related U.S. Application Data

(63) Continuation of application No. PCT/CN2016/076103, filed on Mar. 11, 2016.

(30) Foreign Application Priority Data

Jul. 6, 2015 (CN) .......................... 2015 1 0392218

(51) Int. Cl.
*H02K 21/12*   (2006.01)
*H02K 1/28*    (2006.01)
*H02K 1/27*    (2006.01)

(52) U.S. Cl.
CPC ............. *H02K 1/28* (2013.01); *H02K 1/2726* (2013.01)

(58) Field of Classification Search
CPC .............................. H02K 1/28; H02K 1/2726
(Continued)

(56) References Cited

U.S. PATENT DOCUMENTS 5,936,324 A * 8/1999 Montagu ................ H02K 26/00
                                                310/156.11
8,569,920 B2 * 10/2013 Ramon ................ H02K 5/1672
                                                310/156.08
(Continued)

FOREIGN PATENT DOCUMENTS

| CN | 104518587 | 4/2015 |
| CN | 204761193 | 11/2015 |
| WO | 03021748 | 3/2003 |

OTHER PUBLICATIONS

International Search Report (English and Chinese) and Written Opinion of international application No. PCT/CN2016/076103, dated Jun. 15, 2016, 10 pages.

*Primary Examiner* — Hanh Nguyen
(74) *Attorney, Agent, or Firm* — Hamre, Schumann, Mueller & Larson, P.C.

(57) ABSTRACT

The present invention relates to a shaft-embracing permanent magnet inter-shaft glued stator structure of a high-speed motor; the structure is a shaft-embracing permanent magnet integrated structure; the rotor structure comprises a permanent magnet (2), an output shaft (1) which is connected with one end of the permanent magnet (2) and embraces one part of the permanent magnet (2), and a rear shaft (4) which is respectively connected with the other end of the permanent magnet (2) and the output shaft (1), used for embracing the other part of the permanent magnet (2), and connected with the output shaft (1) to form a sealing mechanism of the permanent magnet (2). Compared with the prior art, the present invention has advantages of good electro-magnetic performance, high reliability, high productivity and good concentricity.

4 Claims, 2 Drawing Sheets

(58) Field of Classification Search
USPC .................................... 310/156.11, 156.12
See application file for complete search history.

(56) References Cited

U.S. PATENT DOCUMENTS

| | | | |
|---|---|---|---|
| 9,800,108 B2* | 10/2017 | Ramdane | H02K 1/2726 |
| 2007/0228847 A1* | 10/2007 | Kim | H02K 1/32 |
| | | | 310/61 |

* cited by examiner

SHAFT-EMBRACING PERMANENT MAGNET INTER-SHAFT GLUED ROTOR STRUCTURE OF HIGH-SPEED MOTOR

BACKGROUND OF THE INVENTION

Technical Field

The present invention relates to a motor rotor structure, in particular, to a shaft-embracing permanent magnet inter-shaft glued rotor structure of a high-speed motor.

Description of the Related Art

In order to obtain a smaller rotation inertia and reduce the effects of the centrifugal force on a permanent magnet, high-speed small motors usually adopt permanent magnet structures with a relatively large draw ratio, as shown in FIG. 1. a1 is a rotor shaft; a2 is a permanent magnet; and a3 are balance rings (one on each of the left and right sides).

With such a structure, the permanent magnet is processed with a thin and long hole which is matched with shafts to form a rotary component. Such structure features less components and easy assembly. However, the space proportion of the permanent magnet is small and the shaft segments that adhere to the permanent magnet occupy space, so the space utilization ratio is low.

In order to handle the effects caused by the thin and long holes, a holding structure in which rectangular key grooves are formed at two ends of the permanent magnet are seen in some literatures, as shown in FIG. 2.

Such a structure abandons the idea of matching with the thin and long hole, the permanent magnet and the shaft b1 are connected through a key b2, increasing the space proportion of the permanent magnet. However, the key b2 may have a relatively large offset after assembly, causing the problem of dynamic balance. Stress may be concentrated at the bottom (straight angle) of the rectangular groove b2. When the glue is ineffective, the key b2 loosens and is thrown out, causing a motor failure.

When the permanent magnet is molded by sintering or punching, the permanent magnet may have initial cracks inside. In order to prevent the rotor of the structure as shown in FIG. 2 from breaking from the positions of the cracks during high-speed rotation, the structure form of protecting the permanent magnet with the steel jacket are put forward in some literatures, as shown in FIG. 3.

Such a structure abandons the two-end holding idea and employs a steel jacket c4 to embrace the permanent magnet c3. The steel jacket c4 and the rear shaft c1 are connected at a weld c2. The steel jacket c4 and the output shaft c6 are connected at a weld c5. Such structure ensures the concentricity of the rear shaft and the output shaft through the inner hole of the steel jacket, imposing high requirements on the precision of the inner hole of the steel jacket which results in large process difficulties.

BRIEF SUMMARY OF THE INVENTION

The objective of the present invention is to provide a shaft-embracing permanent magnet inter-shaft glued rotor structure of a high-speed motor shaft which has good electromagnetic performance, high reliability, high productivity and high concentricity to overcome defects of the prior art.

The objective of the present invention can be fulfilled by the following technical solution:

A shaft-embracing permanent magnet inter-shaft glued stator structure of a high-speed motor, characterized in that the structure is a shaft-embracing permanent magnet integrated structure, the rotor structure is comprised of:

a permanent magnet;

an output shaft, connected with one end of the permanent magnet and embracing one part of the permanent magnet; and, a rear shaft, respectively connected with the other end of the permanent magnet and the output shaft, used for embracing the other part of the permanent magnet and connected with the output shaft to form a sealing mechanism of the permanent magnet.

An end, connected with the permanent magnet, of the output shaft is formed with a first inner hole matched with the permanent magnet.

An end, connected with the permanent magnet, of the rear shaft is formed with a second inner hole matched with the permanent magnet.

The joint between the output shaft and the rear shaft is glued to integrate the output shaft and the rear shaft as a whole.

The output shaft and the rear shaft are both convex structures.

The shafts and the holes inside the shafts are processed at the same station.

The rotor structure takes the excircle of the permanent magnet as a positioning reference.

Compared with the prior art, the present invention has the following advantages:

1) Compared with the thin and long hole structure, the permanent magnet space of the shaft-embracing permanent magnet rotor structure of the present invention is in a high proportion, improving the electromagnetic performance.

2) Compared with the two-end rectangular key groove holding structure, the shaft-embracing permanent magnet rotor structure of the present invention can avoid the problem of large offset caused by incorrect installation.

3) Compared with the steel jacket protecting structure, the shaft-embracing permanent magnet rotor structure of the present invention reduces the structure size, reduces the quantity of components and increases system reliability.

4) Compared with the steel jacket protecting structure, the shaft-embracing permanent magnet rotor structure of the present invention adopts glue adhesion in the middle part, avoiding double welding and improving productivity.

5) Compared with the steel jacket protecting structure, the shafts and holes inside the shafts of the shaft-embracing permanent magnet rotor structure of the present invention are processed at the same station, effectively ensuring the concentricity of the front and rear shaft segments and the holes inside the shafts.

6) Compared with the steel jacket protecting structure, the shaft-embracing permanent magnet rotor structure of the present invention takes the excircle of the permanent magnet as the positioning reference, more effectively ensuring the concentricity of the front and rear shaft segments.

DETAILED DESCRIPTION OF THE INVENTION

The present invention is described in detail with reference to the attached drawings and embodiment.

Embodiment

Figure 1:
FIG. 1 is a schematic view of an existing rotor structure matched with a thin and long hole.
Figure 2:
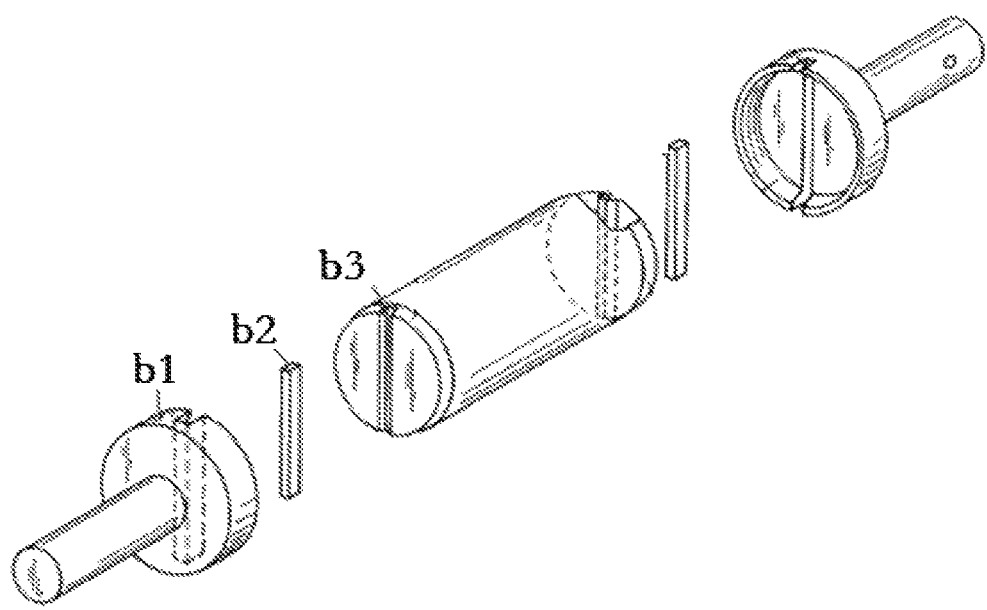
FIG. 2 is a schematic view of an existing rotor structure held by rectangular key grooves at two ends.
Figure 3:
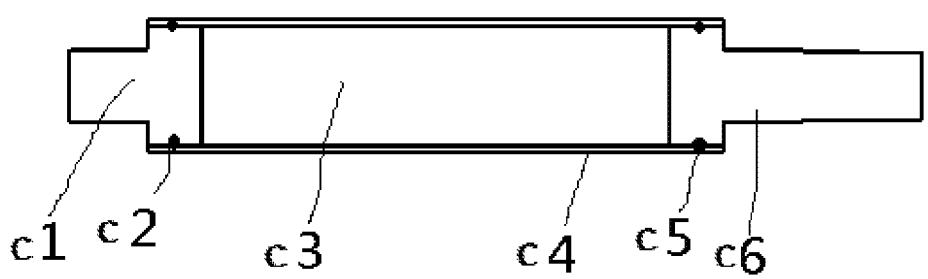
FIG. 3 is a schematic view of an existing rotor structure protected with a steel jacket.
Figure 4:
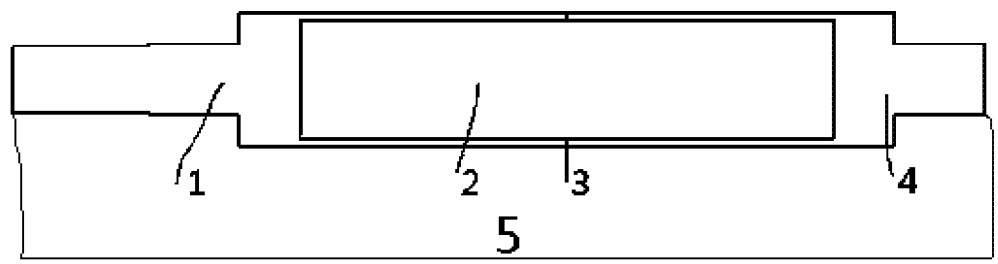
FIG. 4 is a structural view of the present invention.

As shown in FIG. 4, a shaft-embracing permanent magnet inter-shaft glued stator structure of a high-speed motor is provided. The structure is a shaft-embracing permanent magnet integrated structure. The rotor structure 5 includes: a permanent magnet 2, an output shaft 1 which is connected with one end of the permanent magnet 2 and embraces one part of the permanent magnet 2, and a rear shaft 4 which is respectively connected with the other end of the permanent magnet 2 and the output shaft 1, used for embracing the other part of the permanent magnet 2, and connected with the output shaft 1 to form a sealing mechanism of the permanent magnet 2.

An end, connected with the permanent magnet 2, of the output shaft 1 is formed with a first inner hole matched with the permanent magnet 2. An end, connected with the permanent magnet 2, of the rear shaft 4 is formed with a second inner hole matched with the permanent magnet 2.

The joint 3 between the output shaft 1 and the rear shaft 4 is glued to integrate the output shaft and the rear shaft as a whole. The output shaft 1 and the rear shaft 4 are both convex structures. The shafts and the holes inside the shafts are processed at the same station. The rotor structure takes the excircle of the permanent magnet 4 as a positioning reference.

Such rotor structure splits the steel jacket into two halves; inner holes matched with the permanent magnet 2 are respectively processed and formed on the rear shaft 4 and the output shaft 1; after being assembled with the permanent magnet 2, the rear shaft 1 and the output shaft 4 are glued to form the rotor.

What is claimed is:

1. A shaft-embracing permanent magnet inter-shaft glued rotor of a high-speed motor, wherein the rotor has a shaft-embracing permanent magnet integrated structure; the rotor comprising:
    a permanent magnet having a first end and a second end;
    an output shaft, connected with the first end of the permanent magnet and embracing one part of the permanent magnet; and,
    a rear shaft, connected with the second end of the permanent magnet and the output shaft, configured to embrace the other part of the permanent magnet, and connected with the output shaft to form a sealing mechanism of the permanent magnet,
    wherein, the joint between the output shaft and the rear shaft is glued to integrate the output shaft and the rear shaft as a whole,
    wherein, both of the output shaft and the rear shaft have a convex structure.

2. The shaft-embracing permanent magnet inter-shaft glued rotor of a high-speed motor according to claim 1, wherein, connected with the permanent magnet, of the output shaft is formed with a first inner hole matched with the permanent magnet.

3. The shaft-embracing permanent magnet inter-shaft glued rotor of a high-speed motor according to claim 1, wherein, connected with the permanent magnet, of the rear shaft is formed with a second inner hole matched with the permanent magnet.

4. The shaft-embracing permanent magnet inter-shaft glued rotor of a high-speed motor according to claim 1, wherein, the shafts and inner holes of the shafts are processed to correspond to each other, respectively.

* * * * *